United States Patent
Ford et al.

(10) Patent No.: US 8,738,291 B2
(45) Date of Patent: May 27, 2014

(54) METHOD AND SYSTEM FOR REPRESENTING PEDESTRIAN CROSSWALKS IN A GEOGRAPHIC DATABASE USED BY A NAVIGATION SYSTEM

(75) Inventors: Paul T. Ford, Oak Park, IL (US); Suzanne M. McGrath, Chicago, IL (US); Joseph Mays, Chicago, IL (US)

(73) Assignee: Navteq B.V., Veldhoven (NL)

( * ) Notice: Subject to any disclaimer, the term of this patent is extended or adjusted under 35 U.S.C. 154(b) by 1187 days.

(21) Appl. No.: 12/124,253

(22) Filed: May 21, 2008

(65) Prior Publication Data

US 2009/0292457 A1    Nov. 26, 2009

(51) Int. Cl.
*G01C 21/00* (2006.01)
*G01C 21/30* (2006.01)
*G01C 21/32* (2006.01)

(52) U.S. Cl.
USPC .......... 701/433; 701/408; 701/409; 701/431; 701/436; 701/437

(58) Field of Classification Search
None
See application file for complete search history.

(56) References Cited

U.S. PATENT DOCUMENTS

| | | | |
|---|---|---|---|
| 6,119,065 A * | 9/2000 | Shimada et al. | 701/201 |
| 6,144,318 A * | 11/2000 | Hayashi et al. | 340/995.19 |
| 6,208,934 B1 * | 3/2001 | Bechtolsheim et al. | 701/209 |
| 6,374,182 B2 | 4/2002 | Bechtolsheim et al. | 701/209 |
| 6,424,911 B2 * | 7/2002 | Yamashita et al. | 701/208 |
| 6,735,515 B2 | 5/2004 | Bechtolsheim et al. | 701/208 |
| 6,904,360 B2 * | 6/2005 | Pechatnikov et al. | 701/532 |
| 7,113,934 B2 * | 9/2006 | Levesque et al. | 1/1 |
| 7,197,500 B1 * | 3/2007 | Israni et al. | 707/809 |
| 8,184,859 B2 * | 5/2012 | Tanji | 382/104 |
| 2006/0004514 A1 | 1/2006 | Bennett et al. | 701/208 |
| 2006/0074549 A1 * | 4/2006 | Takahashi et al. | 701/207 |
| 2007/0012237 A1 * | 1/2007 | Nielsen | 116/63 R |
| 2007/0233372 A1 * | 10/2007 | Matsunaga et al. | 701/209 |
| 2008/0189239 A1 * | 8/2008 | Bawa et al. | 707/2 |
| 2010/0121886 A1 * | 5/2010 | Koshiba et al. | 707/803 |

OTHER PUBLICATIONS walkway.pdf (http://www.thefreedictionary.com/walkway, Apr. 3, 2013, pp. 1-2).*

* cited by examiner

*Primary Examiner* — Khoi Tran
*Assistant Examiner* — Bao Long T Nguyen
(74) *Attorney, Agent, or Firm* — Lempia Summerfield Katz LLC

(57) ABSTRACT

A geographic database used by a navigation system includes data regarding which corners of an intersection are connected by a crosswalk and the type of crosswalk. The geographic database also includes data regarding locations of crosswalks at a location other than an intersection. Using this information, the navigation system can provide crosswalk information to a pedestrian regarding where to cross a road.

18 Claims, 4 Drawing Sheets

METHOD AND SYSTEM FOR REPRESENTING PEDESTRIAN CROSSWALKS IN A GEOGRAPHIC DATABASE USED BY A NAVIGATION SYSTEM

FIELD

The present invention relates generally to providing navigation guidance to pedestrians, and more particularly, relates to how to represent pedestrian crosswalks in a geographic database used by a navigation system to provide crosswalk guidance to pedestrians.

BACKGROUND

Navigation systems are available that provide end users with various navigation-related functions and features. For example, some navigation systems are able to determine an optimum route to travel along a road and/or a pedestrian pathway from an origin location to a destination location in a geographic region. Using input from the end user, and optionally from equipment that can determine the end user's location (such as a GPS system), the navigation system can examine various potential routes between the origin and destination locations to determine the optimum route.

The navigation system may then provide the end user with information about the optimum route in the form of guidance that identifies the driving and/or walking maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. Additionally, the geographical database may include information about pedestrian pathways, such as whether the pathway is paved or unpaved, whether the pathway is wheel chair accessible, and is whether crosswalks exist. The geographic data may also include information about points of interest, such as restaurants, hotels, airports, gas stations, stadiums, police stations, and so on.

While navigation systems provide useful information to users, there continues to be room for new features and improvements. One area in which there is room for improvement relates to crosswalks. A pedestrian crossing or crosswalk is a designated point on a road at which some means are employed to assist pedestrians wishing to cross. Crosswalks are designed to keep pedestrians together where they can be seen by motorists as they cross the flow of vehicular traffic. Crosswalks are often at intersections, but may also be at other points on busy roads that would otherwise be difficult to attempt to cross. Crosswalks are also common near schools or in other areas where there are a large number of children.

One method of representing a crosswalk using geographic data is described in U.S. Pat. No. 6,374,182, which is assigned to the same assignee as the subject application. In U.S. Pat. No. 6,374,182, crosswalk information may be included as an attribute of a road segment data entity and/or a node data entity. The crosswalk information associated with a road segment data entity may include crosswalk location data that indicates the locations along the length of a represented road segment at which a pedestrian crosswalk exists. The crosswalk location data associated with a node data entity may include data that indicates which of the road segments meet at the location represented by the node data that have pedestrian crosswalks.

Although the crosswalk representation described in U.S. Pat. No. 6,374,182 is useful, there exists room for improvement. Accordingly, it would be beneficial to represent a pedestrian crosswalk based on data that represents corners of an intersection.

SUMMARY

A method and system for representing pedestrian crosswalks in a geographic database that is used by a navigation system is disclosed. An intersection is represented by a node located at a central point where two or more roads meet. The roads are represented by road segments that have an end point at the node. Corners of an intersection are represented by data associated with the road segment located in a circular direction (clockwise or counterclockwise) from the corner. Crosswalks are represented as a pair of corners. This compact representation of a pedestrian crosswalk can be used for standard crossings between adjacent corners of an intersection, diagonal crossings between non-adjacent corners, and midblock crossings located away from an intersection.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Navigation System

Figure 1:
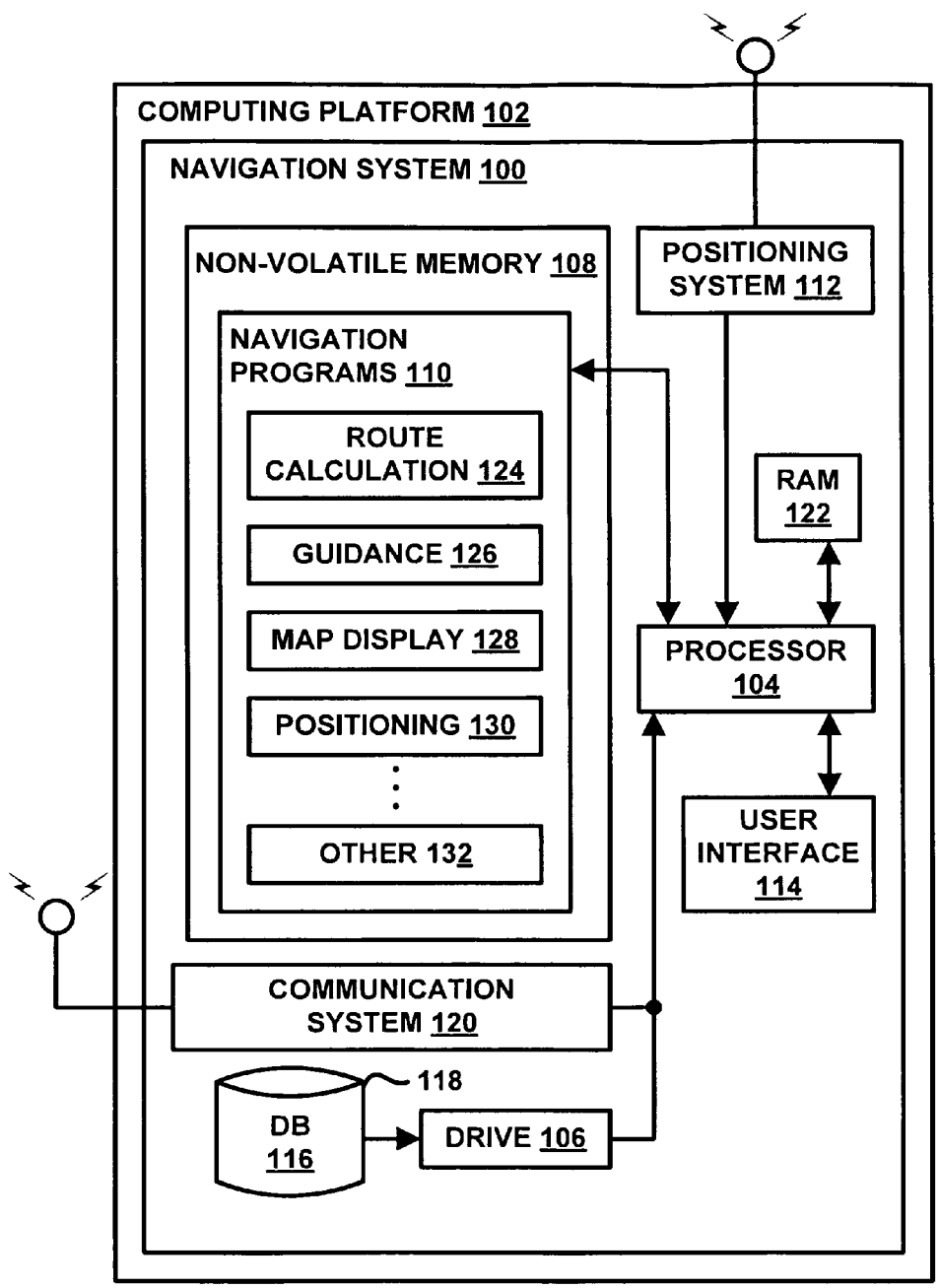
FIG. 1 is a block diagram of a navigation system, according to an example.

FIG. 1 is a block diagram of a navigation system 100 associated with a computing platform 102, such as a personal digital assistant (PDA), mobile telephone, or any other computer. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, now known or developed in the future. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, and orientation of the computing platform 102.

The navigation system 100 also includes a user interface 114 that allows the end user to input information into the navigation system 100 and obtain information from the navigation system 100. The input information may include a request for navigation features and functions of the navigation system 100. To provide navigation features and functions, the navigation system 100 uses a geographic database 116 stored on a storage medium 118.

In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communication system 120, as needed.

In some navigation systems, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions.

The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128, and positioning 130 (e.g., map matching). Other functions and programming 132 may be included in the navigation system 100.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

In one type of geographic database, there is at least one database entry (also referred to as "entity" or "record") for each represented road segment in a geographic region. Each physical road segment has two nodes associated with it, one at each of the endpoints of the road segment. The terms "segment" and "node" represent only one terminology for describing these physical geographic features and other terminology for these features is intended to be encompassed within the scope of these concepts.

Figure 2:
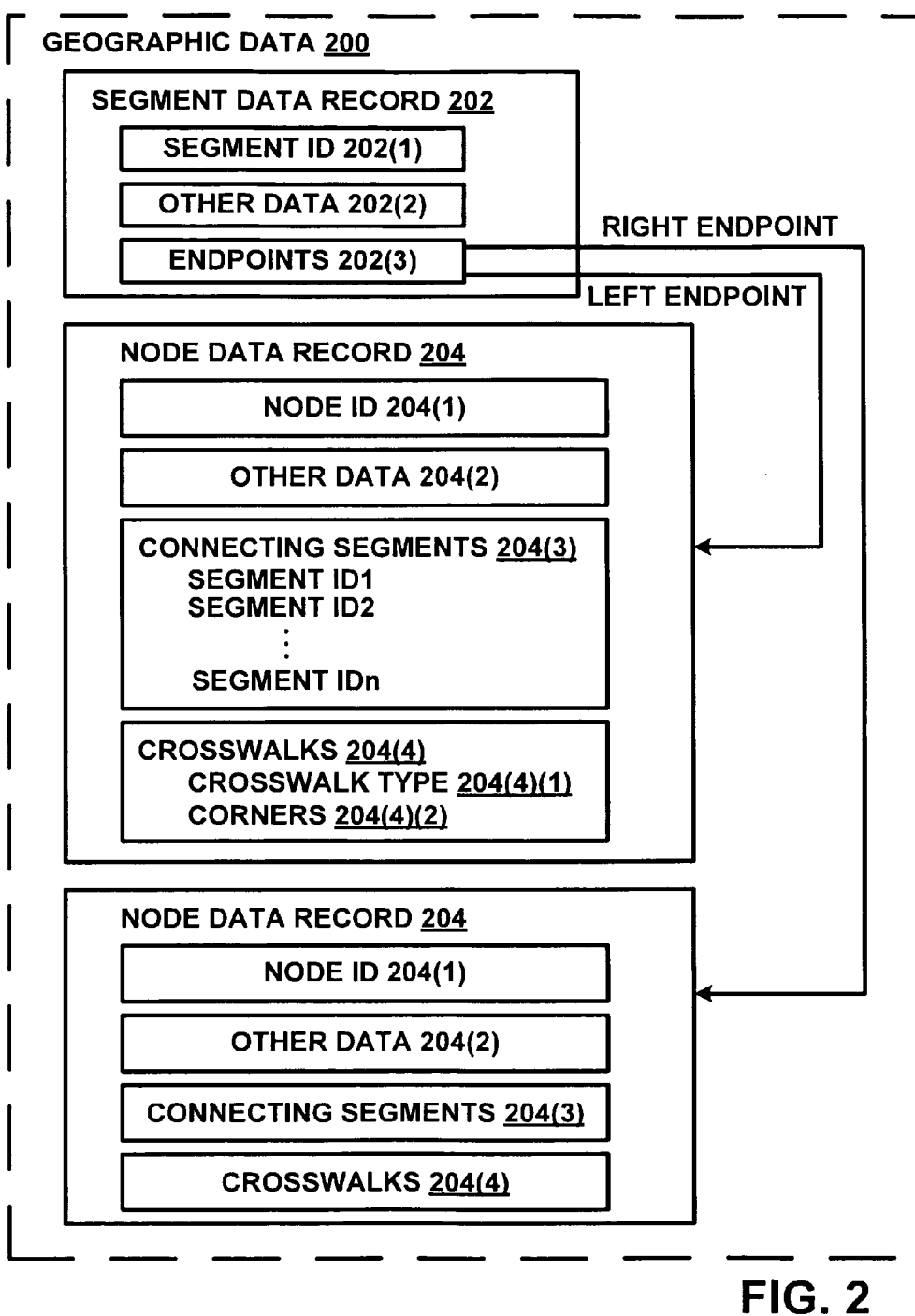
FIG. 2 is a block diagram of data that may be stored in the geographic database depicted in FIG. 1, according to an example.

FIG. 2 is a block diagram of geographic data 200 that may be stored in the geographic database 116 depicted in FIG. 1. The geographic data 200 includes information about one or more geographic regions or coverage areas. The geographic data 200 includes a plurality of road segment data entities 202. Each road segment data entity 202 represents a portion (or segment) of a navigable road in the geographic region. The geographic data 200 also includes a plurality of data entities 204 that represent nodes.

Data attributes are associated with each road segment data record 202 to describe features or characteristics of the represented road segment. FIG. 2 illustrates some of the components of a segment data record 202 included in the geographic data 200. The segment data record 202 includes a segment identifier 202(1) by which the record can be identified in the geographic database 116. The segment data record 202 also includes other data 202(2), such as, but not limited to, data that indicates:

the maximum permitted vehicular speed of travel on the represented road segment;
the permitted direction of vehicular travel on the represented road segment;
the street address range along the represented road segment;
the name of the road of which the represented road segment is a part;
whether the represented road segment is part of a controlled access road (such as an expressway), a ramp to a controlled access road, a bridge, a tunnel, a toll road, a ferry, and so on; and
a rank of the represented road segment.

A rank of a road segment may correspond to its functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes, including side streets and alleyways.

The segment data record 202 also includes data 202(3) identifying the endpoints of the road segment and the location (e.g., the latitude and longitude) of the endpoints. In one embodiment, the endpoint data 202(3) references node data records 204 defined for the nodes corresponding to the endpoints of the represented road segment. By convention, each road segment is considered to have a "left" endpoint and a "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 204 includes a node identifier 204(1) by which the record can be identified in the geographic database 116. The node data record 204 also includes other data 204(2), such as data identifying the geographic coordinates (e.g., the latitude, longitude, and optionally altitude) of the represented node, turn restrictions, and so on.

The node data record 204 also includes data 204(3) identifying road segments that connect to the node to form an intersection. For example, a node identified by a node ID 204(1) may represent an intersection of two roads. At the intersection, each of the two roads may be represented by two road segments (located on opposite sides of the center of the intersection) each having an endpoint at the node. In this example of a standard four-way intersection, the connecting segment data 204(3) includes four segment IDs 202(1) identifying the four road segments that connect to the node to form the intersection.

Figure 3:
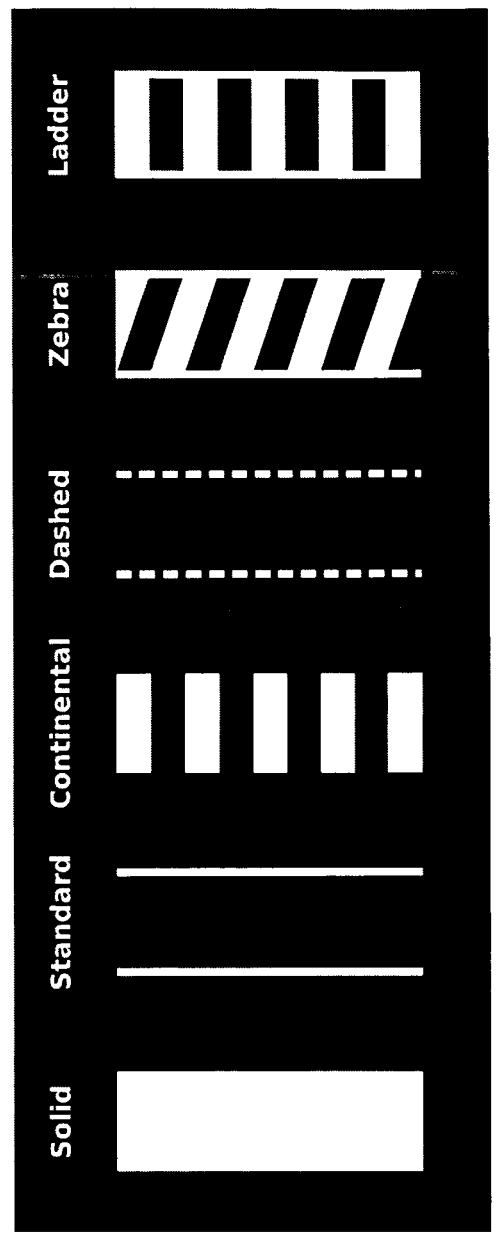
FIG. 3 is a pictorial representation of several types of pedestrian crosswalk marking types, according to an example.

The node data record 204 also includes crosswalk data 204(4). The crosswalk data 204(4) includes data 204(4)(1) that indicates a type of crosswalk. The crosswalk type may be based on crosswalk markings located on the road. FIG. 3 depicts some types of pedestrian crosswalk markings. Other types of crosswalk markings may also be used. The type of crosswalk markings used varies from country to country and from city to city within a country. Additionally, the crosswalk type may be based on the presence of a pedestrian tunnel or bridge. A crosswalk type may also be based on the presence of crossing lights or signs.

The crosswalk type data 204(4)(1) may include a word, such as "zebra," "tunnel," and "light," to indicate the type of pedestrian crosswalk. Alternatively, the crosswalk type data 204(4)(1) may include a code to indicate the type of crossing. The code may include letters, numbers, symbols, combinations of letters, numbers, and/or symbols, or any other type of data representation. For example, the code "CW01" may indicate a standard crossing as depicted in FIG. 3.

The crosswalk data 204(4) also includes data 204(4)(2) that identifies the two corners associated with a crosswalk. An intersection may be represented in the geographic database 116 as a node located at approximately the center of the intersection and road segments having endpoints associated with the node. For example, an intersection of two roads is represented in the geographic database 116 as a node that corresponds to an endpoint of four road segments.

The corner data 204(4)(2) includes a corner label for each of the two corners connected by the crosswalk. Preferably, the corner label identifies the corners of an intersection in a clockwise or counterclockwise manner around the node that represents the intersection in the geographic database 116. The corner label is associated with one of the connecting segments 204(3). For example, a corner label representing a first corner of an intersection is located clockwise from a first connecting segment. Using this ordering, each corner can be represented by a single segment and a crosswalk between two corners can be represented using two segments, one for each corner. Because of the bidirectional nature of pedestrian crosswalks, the order of the corners in a crossing is not important.

III. Representing Pedestrian Crosswalks

Figure 4:
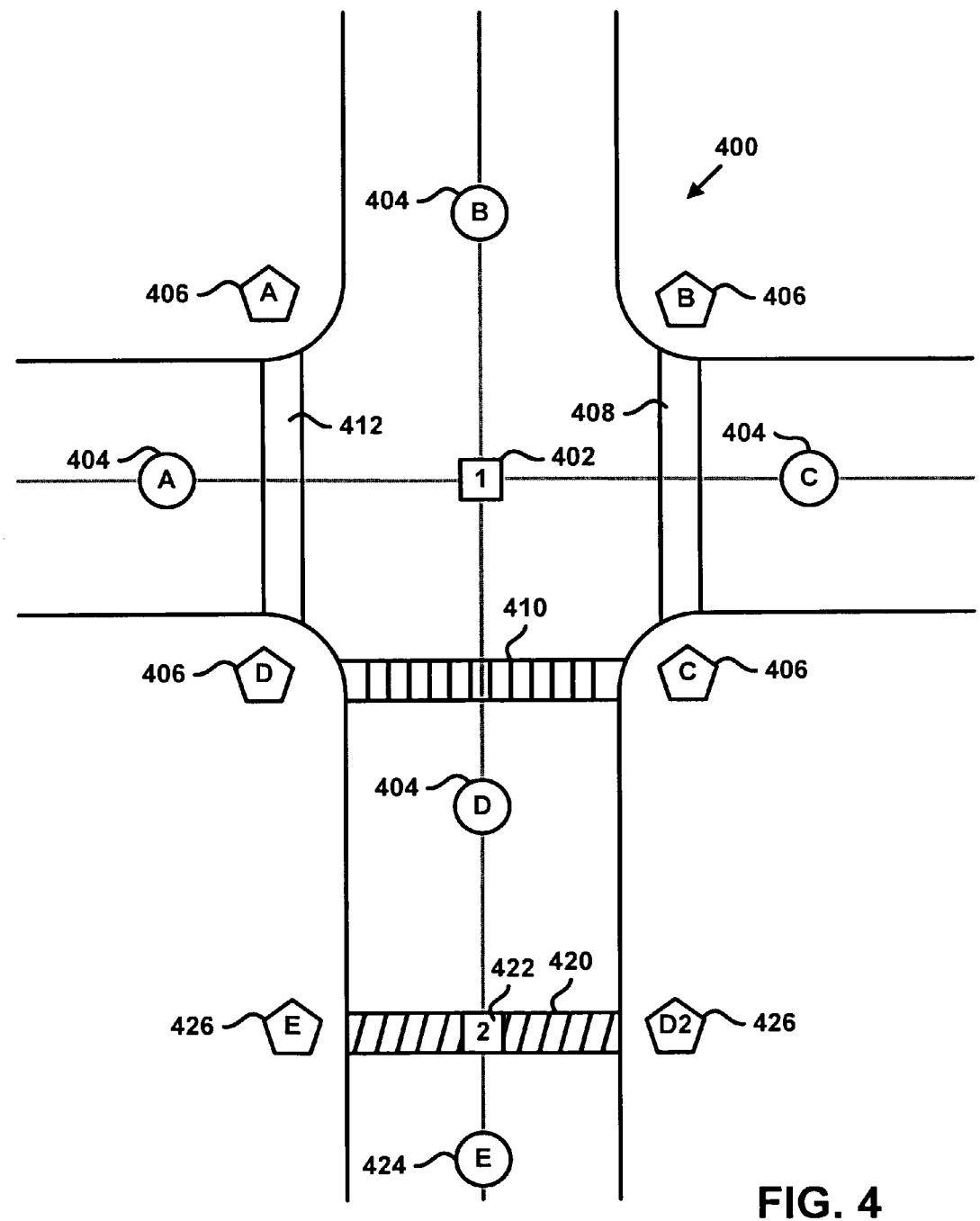
FIG. 4 illustrates several crosswalks located in a geographic area, according to an example.

FIG. 4 illustrates crosswalks 408, 410, 412 at an intersection 400. The intersection 400 is a standard four-way intersection where two roads meet. The intersection 400 is represented by a node 402 and four connecting road segments 404. The four road segments 404 have endpoints at the node 402. The node 402 is depicted in FIG. 4 as a square enclosing a node identifier 204(1) (number 1 in this example). The four road segments 404 are depicted in FIG. 4 with a circle enclosing a segment identifier 202(1) (letters A, B, C, and D in this example).

The intersection 400 includes four corners 406. The four corners 406 are depicted in FIG. 4 as a pentagon enclosing a corner label 204(4)(2). In this example, the corner labels 204(4)(2) are associated with the segment identifier 202(1) for the segment 404 that is located in a counterclockwise direction from the corner. In other words, the corner 406 located clockwise from the road segment identifier "A" has a corner label "A." In a similar manner, the corner 406 with corner label "B" is located clockwise from the segment 404 identified with the segment identifier "B," the corner 406 with corner label "C" is located clockwise from the segment 404 identified with the segment identifier "C," and the corner 406 with corner label "D" is located clockwise from the segment 404 identified with the segment identifier "D." While this example uses a clockwise ordering of the corners 406, it is understood that a counterclockwise or other manner of ordering may also be used.

The intersection 400 includes three crosswalks 408, 410, 412. The crosswalks 408, 410, 412 are represented as a pair of corner labels 204(4)(2). In this example, the crosswalks 408, 410, 412 are represented by B-C, C-D, and D-A, respectively. As seen in FIG. 4, there is no crosswalk located between the corners A and B, thus, the geographic data 200 does not include the pair of corner labels A-B.

The crosswalk type data 204(4) identifies the type of crosswalks located at the intersection 400. For the crosswalks 408, 412 defined by the corner pairs B-C and D-A, the crosswalk type data 204(4) includes data that identifies the crosswalks 408, 412 as standard or parallel crossings. For the crosswalk 410 defined as the corner pair C-D, the crosswalk type data 204(4) includes data that identifies the crosswalk 410 as a ladder crossing.

In this example, the crosswalks 408, 410, 412 in the intersection 400 are represented in the geographic database 116 by the following data.

| Crosswalk Type | Node | Corner | Corner |
|---|---|---|---|
| Standard | 1 | B | C |
| Ladder | 1 | C | D |
| Standard | 1 | D | A |

While not depicted in FIG. 4, crosswalks can also be located between two non-adjacent corners as well. For example, a crosswalk may be defined for the corner pairs A-C and B-D. The same crosswalk representation described for a standard four-way intersection can also be used for intersections represented by three or more than four road segments having end points corresponding to a node.

Crosswalks that are not located at an intersection can also be represented in a similar manner. For example, FIG. 4 depicts a crosswalk 420 located away from the intersection 400. A node 422 having the node identifier 204(1) of "2" is located at the crossing point. Two road segments 404, 424 having the segment identifiers 202(1) of "D" and "E" have endpoints corresponding to the node 422. The road segment 404 identified as "D" also has an endpoint connected to the node 402 identified as "1."

Two "corners" 426 define where the crosswalk 420 meets the opposite sides of the road. Using the labeling convention described with respect to the intersection 400, the corner 426 that includes "D" in the corner label is located clockwise from the segment 404 identified with the segment identifier "D" and the corner 426 with corner label "E" is located clockwise from the segment 424 identified with the segment identifier "E." To avoid confusion with two corners having the label "D," the corner label 204(4)(2) may be modified to include node identifier ID 204(1) as well. As shown in FIG. 4, the corner 426 associated with the segment "D" has the corner label "D2" to indicate that this corner is associated with node 2. While not shown in FIG. 4, the corner 406 associated with the segment "D" may have the corner label "D1" to indicate that this corner is associated with node 1.

The crosswalk 420 is represented as a pair of corner labels D2-E. The crosswalk type data 204(4) identifies the crosswalk D2-E as a zebra crossing. Thus, the crosswalk 420 is represented in the geographic database 116 by the following data.

| Crosswalk Type | Node | Corner | Corner |
|---|---|---|---|
| Zebra | 2 | D2 | E |

By including data 204(4)(1) that indicates a type of crosswalk in the geographic database 116, crosswalk type information can be provided to a user of the navigation system 100. For example, as the user approaches an intersection, the navigation system 100 determines whether a crosswalk is located between two corners of the intersection. If a crosswalk is located between two corners of the intersection, the navigation system 100 retrieves geographic data from the geographic database 116 representing the two corners 204(4)(2) and the type of crosswalk 203(4)(1). The retrieved geographic data is used to provide crosswalk information to the user.

Moreover, by ordering road segments meeting at an intersection in a circular (clockwise or counterclockwise) direction provides a compact representation of each corner, which results in an easy identification of corner-to-corner crossings. Because this data representation also works for crosswalks not located at intersections, only one type of crosswalk representation is necessary regardless of where a crosswalk is located.

It is intended that the foregoing detailed description be regarded as illustrative rather than limiting. For example, different navigation system designs and geographic data organizations may be used. It is also understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A geographic database that represents a road network in a geographic area, comprising:
   data entities that represent road segments;
   data entities that represent nodes located at both endpoints of the road segments, wherein a location of an intersection of at least two roads represented by the road segments is represented by a single node;
   data representing corners located at the intersection;
   data identifying whether a crosswalk connects two of the corners located at the intersection; and
   data identifying a code representing an appearance type of the crosswalk connecting two corners of the intersection, wherein a processor of a navigation system is configured to provide crosswalk type information according to the code representing the appearance type of the crosswalk connecting two corners of the intersection,
   wherein the code representing the appearance type of crosswalk is based on crosswalk markings located on a road.

2. The geographic database of claim 1, wherein the crosswalk markings are selected from the group consisting of solid, standard, continental, dashed, zebra, and ladder.

3. The geographic database of claim 1, wherein the appearance type of crosswalk is based on presence of at least one of a pedestrian tunnel, a pedestrian bridge, a crossing light, and a crossing signal.

4. The geographic database of claim 1, wherein the data representing the corners located at the intersection is associated with the data entities that represent the road segments.

5. The geographic database of claim 1, wherein the data representing the corners located at the intersection includes a reference to an identifier of a road segment located closest to the corner in a circular manner.

6. The geographic database of claim 1, wherein the data identifying whether a crosswalk connects two corners located at the intersection includes a pair of corner labels associated with the two corners connected by the crosswalk.

7. The geographic database of claim 6, wherein the pair of corner labels includes data associated with the road segments that form the intersection.

8. A navigation system comprising:
   a geographic database that represents a road network in a geographic area, the geographic database comprising:
   data entities that represent road segments;
   data entities that represent nodes located at both endpoints of the road segments, wherein a location of an intersection of at least two roads represented by the road segments is represented by a single node;
   data representing corners located at the intersection that includes a corner label identifying a road segment located closest to the corner in a circular manner;
   when a crosswalk is located at the intersection, data representing a pair of corner labels that identifies the two corners connected by the crosswalk;
   data identifying an appearance type of the crosswalk; and
   a processor configured to provide a crosswalk type code to the navigation system according to the appearance type of the crosswalk based on crosswalk markings located on a road.

9. The geographic database of claim 8, wherein the crosswalk markings are selected from the group consisting of solid, standard, continental, dashed, zebra, and ladder.

10. The geographic database of claim 8, wherein the appearance type of crosswalk is based on presence of at least one of a pedestrian tunnel, a pedestrian bridge, a crossing light, and a crossing signal.

11. A navigation system, comprising:
    a geographical database including:
    an identifier for road segments associated with an intersection;
    a label for each corner of the intersection, wherein the label is based on the road segment identifier associated with the road segment located closest to the corner in a circular manner;
    a pair of corner labels that identify corners connected by the crosswalk; and
    a code representing an appearance type of the crosswalk based on crosswalk markings located on a road; and
    a processor configured to provide crosswalk type information to the navigation system according the code representing the appearance type of the crosswalk.

12. The geographic database of claim 11, wherein the crosswalk markings are selected from the group consisting of solid, standard, continental, dashed, zebra, and ladder.

13. The geographic database of claim 11, wherein the appearance type of crosswalk is based on presence of at least one of a pedestrian tunnel, a pedestrian bridge, a crossing sight, and a crossing signal.

14. The geographic database of claim 11, further comprising an identifier for a node that represents the intersection, wherein the label is further based on the node identifier associated with the intersection.

15. A method for providing crosswalk guidance to an end-user of a navigation system, comprising:
- as the end-user approaches an intersection, a navigation system determining whether a crosswalk is located between two corners of the intersection;
- the navigation system identifying a crosswalk is located between two corners of the intersection;
- the navigation system retrieving geographic data from a geographic database representing the two corners and a code for an appearance type of pedestrian crosswalk based on roadway crosswalk markings; and
- the navigation system providing the end-user information regarding the crosswalk based on the retrieved geographic data representing the two corners and the appearance type of the pedestrian crosswalk.

16. The method of claim 15, wherein the geographic data representing the two corners includes data associated with road segments that form the intersection.

17. The method of claim 15, wherein the geographic data representing the two corners includes a pair of corner labels.

18. The method of claim 17, wherein each of the corner labels includes a reference to an identifier of a road segment located closest to the respective corner in a circular manner.

\* \* \* \* \*